(12) United States Patent
Tingle (10) Patent No.: US 11,117,333 B2
(45) Date of Patent: Sep. 14, 2021

(54) COMPOSITE MATERIAL LAY-UP EQUIPMENT

(71) Applicant: Rolls-Royce PLC, London (GB)

(72) Inventor: James Tingle, Derby (GB)

(73) Assignee: Rolls-Royce plc, London (GB)

( * ) Notice: Subject to any disclaimer, the term of this patent is extended or adjusted under 35 U.S.C. 154(b) by 142 days.

(21) Appl. No.: 16/348,491

(22) PCT Filed: Nov. 10, 2017

(86) PCT No.: PCT/GB2017/053401
§ 371 (c)(1),
(2) Date: May 8, 2019

(87) PCT Pub. No.: WO2018/087565
PCT Pub. Date: May 17, 2018

(65) Prior Publication Data
US 2020/0215766 A1    Jul. 9, 2020

(30) Foreign Application Priority Data

Nov. 11, 2016 (GB) ...................................... 1619076

(51) Int. Cl.
B29C 70/38 (2006.01)
B29C 70/54 (2006.01)
B29K 63/00 (2006.01)

(52) U.S. Cl.
CPC .......... B29C 70/384 (2013.01); B29C 70/545 (2013.01); B29C 70/388 (2013.01);
(Continued)

(58) Field of Classification Search
CPC ... B29C 70/384; B29C 70/382; B29C 70/386; B29C 70/388; B29C 70/38;
(Continued)

(56) References Cited

U.S. PATENT DOCUMENTS 5,698,066 A    12/1997 Johnson et al.
5,700,347 A    12/1997 Mccowin
(Continued)

FOREIGN PATENT DOCUMENTS

CN    101132903    2/2008
CN    102196897    9/2011
(Continued)

OTHER PUBLICATIONS

International Application No. PCT/GB2017/053401, International Search Report dated Feb. 9, 2018, 5 pgs.
(Continued)

*Primary Examiner* — Philip C Tucker
*Assistant Examiner* — Christopher C Caillouet
(74) *Attorney, Agent, or Firm* — Schwegman Lundberg & Woessner, P.A.

(57) ABSTRACT

There is disclosed a composite material lay-up head (20) for applying elongate fibre reinforcement material (14) to a tool (12), the head (20) comprising: at least one elongate tow guide channel (32) for guiding fibre reinforcement material (14) from a tow inlet (33) to a tow outlet (35) of the channel (32); and feed apparatus (36, 38) for feeding fibre reinforcement material through the at least one channel (32); wherein the or each channel (32) is provided with at least one nozzle (60) arranged so that in use a jet of gas can be delivered into the channel (32) so as to inhibit contact between fibre reinforcement material (14) in the channel (32) and the channel (32).

14 Claims, 5 Drawing Sheets

(52) U.S. Cl.
CPC ............... *B29C 2793/0027* (2013.01); *B29C 2793/0081* (2013.01); *B29K 2063/00* (2013.01); *Y10T 156/1317* (2015.01); *Y10T 156/1322* (2015.01)

(58) Field of Classification Search
CPC ............... B29C 70/545; Y10T 83/2196; Y10T 83/2209; Y10T 83/9411; Y10T 83/9447; Y10T 156/1322; Y10T 156/1317
See application file for complete search history.

(56) References Cited

U.S. PATENT DOCUMENTS

| | | | |
|---|---|---|---|
| 2006/0070697 A1 | 4/2006 | Hoffmann | |
| 2008/0202691 A1 | 8/2008 | Hamlyn et al. | |
| 2008/0216961 A1* | 9/2008 | Hamlyn | B26D 1/085 |
| | | | 156/391 |
| 2009/0229760 A1* | 9/2009 | Hamlyn | B29C 70/384 |
| | | | 156/433 |
| 2011/0117231 A1 | 5/2011 | Klockow et al. | |
| 2014/0259630 A1 | 9/2014 | Johnson et al. | |
| 2014/0260858 A1 | 9/2014 | Johnson et al. | |

FOREIGN PATENT DOCUMENTS

| | | |
|---|---|---|
| CN | 104540662 | 4/2015 |
| CN | 104608397 | 5/2015 |
| DE | 102013109170 B3 | 10/2014 |
| EP | 0241251 A1 | 10/1987 |
| FR | 3009827 A1 | 2/2015 |
| WO | WO-2006034438 A2 | 3/2006 |
| WO | WO-2015170016 A1 | 11/2015 |

OTHER PUBLICATIONS

International Application No. PCT/GB2017/053401, Written Opinion dated Feb. 9, 2018, 7 pgs.
UK Application Serial No. GB1619076.1, Search Report under Section 17 dated Mar. 22, 2017, 4 pgs.
"Chinese Application Serial No. 201780072923, Notification of First Office Action dated Oct. 12, 2020", w/ English Translation, 11 pgs.

* cited by examiner

COMPOSITE MATERIAL LAY-UP EQUIPMENT

CLAIM OF PRIORITY

This application is a U.S. National Stage Filing under 35 U.S.C. 371 from International Application No. PCT/GB2017/053401, filed on Nov. 10, 2017, and published as WO 2018/087565 A1 on May 17, 2018, which claims the benefit of priority United Kingdom Patent Application No. 1619076.1, filed on Nov. 11, 2016, each of which is incorporated by reference herein in its entirety.

TECHNICAL FIELD

The invention relates to composite material lay-up equipment, in particular, composite material lay-up equipment arranged to inhibit contact between a length of fibre reinforcement material and a channel for receiving the material.

BACKGROUND

Fibre composite components are frequently used for applications requiring a combination of light weight and strength, for example in sports equipment and in aerospace components. Most fibre composite manufacturing processes require successive layers of fibre reinforcement material to be applied to a tool, article or a mould in a lay-up process. A matrix material is typically pre-applied to the fibre reinforcement material (pre-impregnated, or "pre-preg") before lay-up of the component. Recent manufacturing developments have allowed the lay-up process be performed automatically.

Three exemplary automatic composite manufacturing processes are Automatic Tape Laying (ATL), Automatic Fibre Placement (AFP) and automatic filament winding. Briefly, ATL relates to the application of a tape comprising fibre reinforcement material to a tool. The tape typically comprises unidirectional fibres which are pre-impregnated with matrix material (e.g. epoxy resin). Successive tape layers are typically applied at different orientations from one another to form a ply structure. The tape is typically applied to the tool by an applicator roller.

In AFP, the fibre reinforcement material is applied to a tool in the form of a "tow", comprising a plurality of individual fibres, or multiple "tows". Alternatively, a "tow" may be a narrow width of tape slit from a wider tape. AFP is typically more suitable for complex parts having a higher degree of curvature or non-uniform curvature. The fibres are typically pre-impregnated with matrix material or drawn through a bath of matrix material. A course or series of "tows" is typically applied to the tool by an applicator roller.

Automatic filament winding differs from AFP in that the tool is typically a rotating mandrel and the lay-up equipment typically traverses the mandrel to apply a tow of fibres in tension over the mandrel surface. The angle at which the tow is laid over the mandrel can be adjusted between successive passes of the mandrel such that successive layers lie at different orientations from one another to form a ply structure and to influence the properties of the component (e.g. improved compressive or tensile strength of the manufactured component). The tow of fibres is typically applied to the article by virtue of tensile forces in the tow between the mandrel and an applicator roller of the lay-up equipment.

In all of the above processes it is desirable for the tow or tape to be tacky when it is applied to the article, which requires the tow or tape to be above a threshold temperature when applied. Previously considered fibre placement heads have incorporated a number of different devices for ensuring that the tows or tape are sufficiently heated before application to a tool, such as infrared lamps that heat the tows as they travel through or over the head. Further, previously considered fibre placement heads may receive the tow or tape at a sufficiently high temperature to be tacky, for example, if the tow or tape is received directly from a heated bath of matrix material, or if the tow is tacky at ambient temperature.

However, such fibre placement heads suffer from the drawback that in use the tows or tape tend to be tacky, and therefore can adhere to the components of the head. This may result in equipment malfunction and downtime to repair the equipment.

SUMMARY

Accordingly, it is desirable to provide an improved composite material lay-up head.

According to an aspect of the invention there is provided a composite material lay-up head for applying elongate fibre reinforcement material to a tool, the head comprising: at least one elongate tow guide channel for guiding fibre reinforcement material from a tow inlet to a tow outlet of the channel; and feed apparatus for feeding fibre reinforcement material through the at least one channel; wherein the or each channel is provided with at least one nozzle arranged so that in use a jet of gas can be delivered into the channel so as to inhibit contact between fibre reinforcement material in the channel and the channel.

There may be a plurality of channels side-by-side for guiding a plurality of individual lengths of fibre reinforcement material. The channels may be enclosed except for the tow inlet and the tow outlet. The or each nozzle may be disposed in a wall of the channel. The or each nozzle may extend into the channel, or may project through the channel wall into the channel. The or each nozzle may be provided with a valve for regulating the flow rate of the jet, which may be the velocity flow rate, the mass flow rate or the volumetric flow rate of the jet.

Each channel may be provided with a plurality of nozzles each arranged to deliver a jet of gas into the respective channel. There may be a plurality of nozzles spaced apart along each channel.

Each nozzle may be arranged to deliver a jet of gas into the respective channel underneath the fibre reinforcement material. Accordingly, the jet may inhibit contact between a lower wall of the channel and the fibre reinforcement material.

Two opposing sides of each channel may be each provided with at least one nozzle to inhibit contact between the respective fibre reinforcement material and the respective opposing walls of the channel. At least two nozzles associated with a channel may be arranged to direct respective jets of gas to opposite faces of a length of fibre reinforcement material in the channel. Each channel may have four walls and may be substantially cuboidal. Each channel and the feed apparatus may be arranged so that two opposing walls are substantially parallel with a length of elongate fibre reinforcement material received in the channel.

The or each nozzle may be arranged to deliver a jet of gas into the respective channel along a direction substantially perpendicular to the elongate extent of the channel. Accordingly, the jet of gas may impinge on a face of the fibre reinforcement material. Contact between the fibre reinforcement material and the wall of the channel in which the or each nozzle is disposed may therefore be prevented as the jet exerts a pressure force on the length of material (i.e. a pressure force resulting from the impinging jet of the nozzle).

The or each nozzle may be arranged to deliver a jet of gas into the respective channel along a direction substantially parallel to the elongate extent of the channel. Accordingly, contact between the length of fibre reinforcement material and the or each wall of the channel may be prevented by the presence of a jet of gas between the or each wall of the channel and the fibre reinforcement material, which may act to deflect the material away from the channel wall. There may be at least two such nozzles arranged to deliver jets along opposite sides of the material.

The or each nozzle may be provided with a nozzle guard arranged to inhibit fibre reinforcement material from closing the nozzle by contact with the nozzle. For example, the nozzle guard may comprise a bar raised relative the outlet of the jet.

The or each nozzle may be provided adjacent to the tow inlet or the tow outlet of a respective channel. The or each channel may comprise: a first portion adjacent to the tow inlet and provided with at least one first nozzle arranged to deliver a jet of gas into the first portion of the channel; and a second portion adjacent to the tow outlet and provided with at least one second nozzle arranged to deliver a jet of gas into the second portion of the channel.

The composite material lay-up head may further comprise at least one nozzle arranged to direct a jet of gas onto the tool. The nozzle may be arranged to direct a jet of gas directly onto the tool from the nozzle so that the jet does not pass through a channel for fibre reinforcement material.

The composite material lay-up head may further comprise a cutting mechanism for severing individual lengths of fibre reinforcement material.

According to a second aspect of the invention there is provided composite material lay-up equipment comprising a composite material lay-up head in accordance with the first aspect of the invention and pneumatic apparatus arranged to provide a gas to the or each nozzle.

The pneumatic apparatus may be arranged to generate pressurised gas (i.e. as opposed to comprising a cylinder of compressed gas), for example, the pneumatic apparatus may comprise a compressor or blower. Alternatively, the pneumatic apparatus may be a store of compressed gas, for example compressed air in a gas cylinder. The pneumatic apparatus may comprise a manifold for distributing the gas to each of the channels (i.e. to each of the nozzles).

The pneumatic apparatus may be arranged to provide a cool gas to the or each nozzle, so that in use, fibre reinforcement material is cooled as it travels through the or each channel. The temperature of the cool gas may be 15° C. or less, 10° C. or less, 5° C. or less, 2° C. or less, 1° C. or less, or 0° C. or less.

The pneumatic apparatus may comprise a vortex chiller. The vortex chiller may be located within the composite material lay-up head. The pneumatic apparatus may comprise a cooling chamber disposed within the composite material lay-up head and thermally coupled to the channels. The cooling chamber may be arranged to receive a flow of cool gas from a vortex chiller.

The pneumatic apparatus may be arranged to cool at least part of the composite-material lay-up head so that the walls of the channels are cooled at least partly by conduction.

The pneumatic apparatus may be arranged to provide a hot gas to the or each nozzle, so that in use, fibre reinforcement material is heated by the jets of the gas as it travels through the or each channel. The pneumatic apparatus may comprise a heater configured to provide a hot gas. The pneumatic apparatus may be configured so that in use the temperature of the hot gas is at least 40° C., at least 50° C., at least 60° C., at least 70° C., at least 80° C., at least 90° C., or at least 100° C., The pneumatic apparatus may be mounted to the composite material lay-up head. Alternatively, the pneumatic apparatus may be separate from the composite material lay-up head, for example, the pneumatic apparatus may comprise a store of compressed gas in a workshop environment, or a compressor situated apart from but fluidically coupled to the composite material lay-up head. At least a part of the pneumatic apparatus may be mounted to the composite material lay-up head, such as a vortex chiller or other apparatus for either heating, cooling, or pressurizing (compressing) the gas flow.

The or each channel may comprise a first portion adjacent to the tow inlet and provided with at least one first nozzle arranged to deliver a jet of gas into the first portion of the channel; and a second portion adjacent to the tow outlet and provided with at least one second nozzle arranged to deliver a jet of gas into the second portion of the channel; and the pneumatic apparatus may be configured to provide cool gas to the or each first nozzle and hot gas to the or each second nozzle. Accordingly, fibre reinforcement material passing through each channel may be initially cooled and then heated before application to the tool.

According to a third aspect of the invention there is provided a method of applying composite material to a tool using a composite material lay-up head or equipment in accordance with the first or second aspect of the invention, the method comprising: guiding elongate fibre reinforcement material through the or each channel; delivering a jet of gas into the or each channel through the or each nozzle so that the jet of gas inhibits contact between the fibre reinforcement material and the channel; and applying the lengths of elongate fibre reinforcement material to a tool.

The jet of gas may be cool so that the fibre reinforcement material is cooled as it travels through the or each channel.

The method may further comprise heating the tool so that the fibre reinforcement material is heated as it is applied to the tool. The tool may be heated by directing a jet of hot gas from the pneumatic apparatus onto the tool. Alternatively, the tool may be heated by a heater, such as an internal heater located within or coupled to the tool.

Where the or each channel comprises first and second portions as described above, the method may comprise: delivering a jet of cool gas into the first portion of the or each channel; and delivering a jet of hot gas into the second portion of the or each channel.

LIST OF DRAWINGS

Embodiments of the invention will now be described, by way of example, with reference to the following drawings, in which.

DETAILED DESCRIPTION

Figure 1:
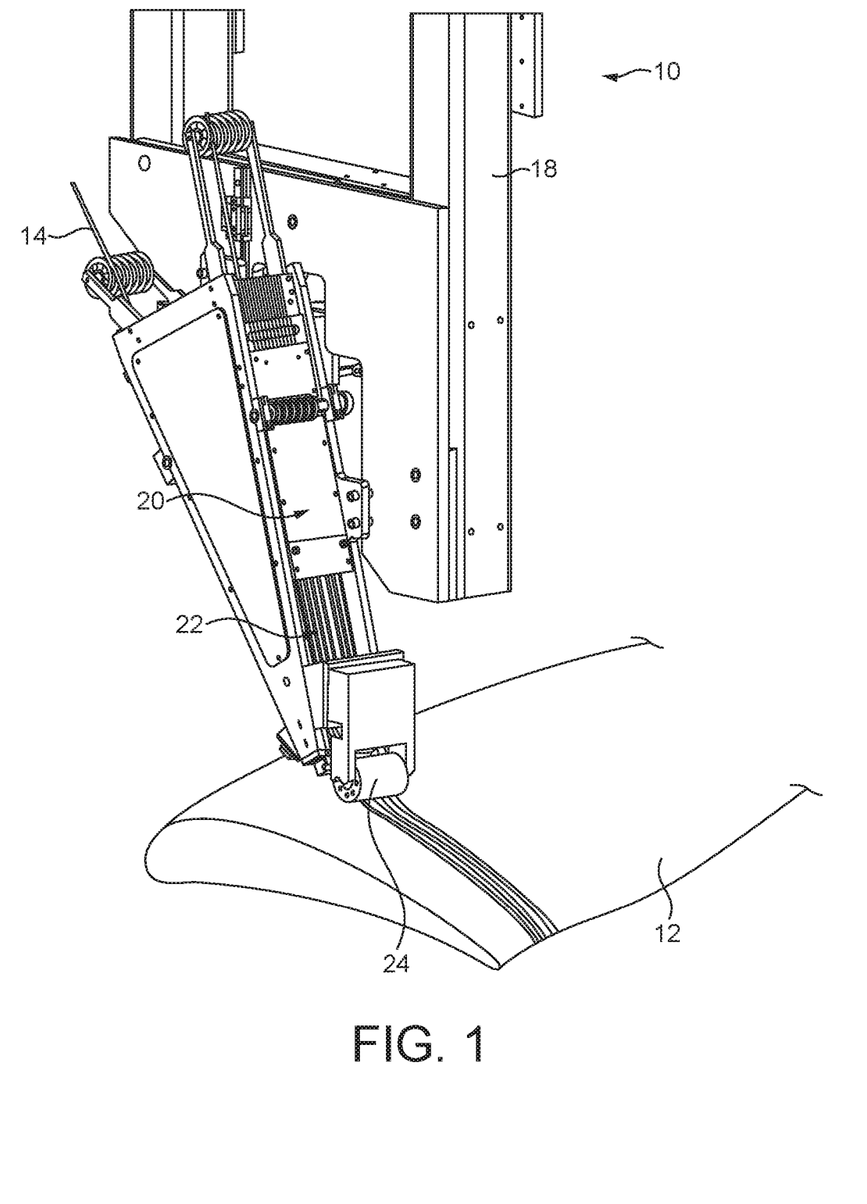
FIG. 1 schematically shows composite material lay-up equipment according to an embodiment of the invention in use.

FIG. 1 shows a composite material lay-up machine 10 and a tool 12 to which fibre composite material is being applied to form a composite material component, for example an aerospace component such as a wing. As shown in FIG. 1, the machine 10 performs a lay-up process in which fibre composite tows 14 are applied to the tool 12. The machine 10 comprises a base or gantry and a manipulation device 18 extending from the base or gantry, the manipulation device 18 supporting a support head 20 (or fibre placement head) which carries a cutting mechanism 22 at its distal end.

In use, the machine 10 feeds several tows 14 through the support head 20 and the cutting mechanism 22 and applies the tows 14 to the tool 12 using an applicator roller 24. At the end of an appropriate stage of the lay-up process, the tows 14 are cut by the cutting mechanism 22. The tows 14 are pre-impregnated with matrix material such as epoxy resin.

Figure 2:
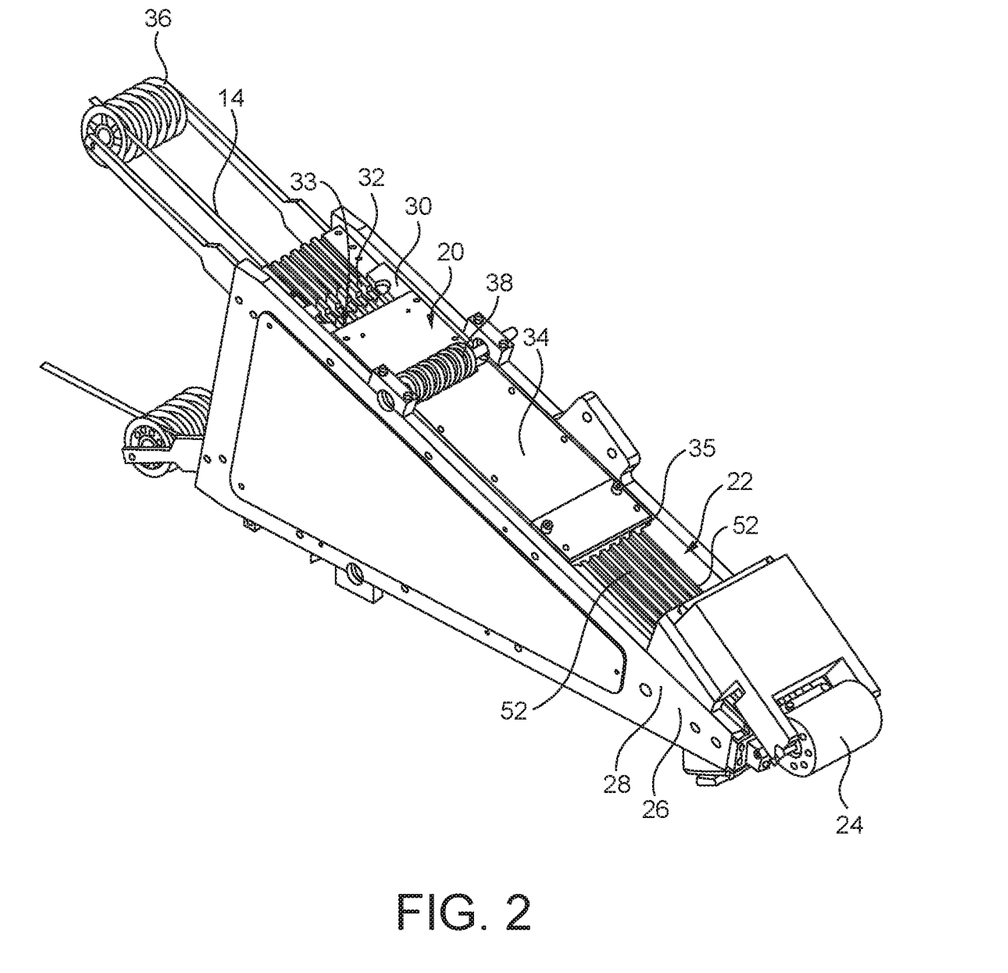
FIG. 2 shows the composite material lay-up equipment of FIG. 1.

As shown in FIG. 2, the support head 20 and the cutting mechanism 22 extend in a generally longitudinal application direction from the proximal end of the support head, which in use is attached to the manipulation device 18 (not shown in FIG. 2), to a distal tip region 26 of the cutting mechanism 22 where the tow 14 is applied to the tool 12 (not shown) and intermittently cut.

The support head 20 comprises two parallel triangular side plates 28 extending from the proximal end of the support head 20 to the tip region 26 of the machine. The side plates 28 are in the shape of an acute isosceles triangle which gives the support head 20 and the cutting mechanism 22 a tapered or converging profile. The support head 20 further comprises upper and lower feed plates 30 supported between the side plates 28, both plates 30 being arranged to convey tows 14 along a plurality of adjacent channels 32 towards the cutting mechanism 22.

In this embodiment, each feed plate 30 has six adjacent channels 32 each having a tow channel inlet and a tow channel outlet 33. Each feed plate 30 is provided with an outer cover plate 34 which in use encloses the tows 14 in the channels 32, and which can be removed, if necessary, to expose the tows 14 within the channels, for instance if the channels become blocked. In other embodiments, the cover plate 34 may be integrally formed with or permanently secured to the feed plate 30.

Tow feeding apparatus is provided for feeding the tows 14 into and through the channels 32. Upper and lower redirecting rollers 36 are coupled to the side plates 28 and extend behind the support head for guiding the tows 14 into the channels 32. Further, feed rollers 38 extend through corresponding gaps in the cover plates 34 to drive the tows 14 through the channels 32.

Figure 3:
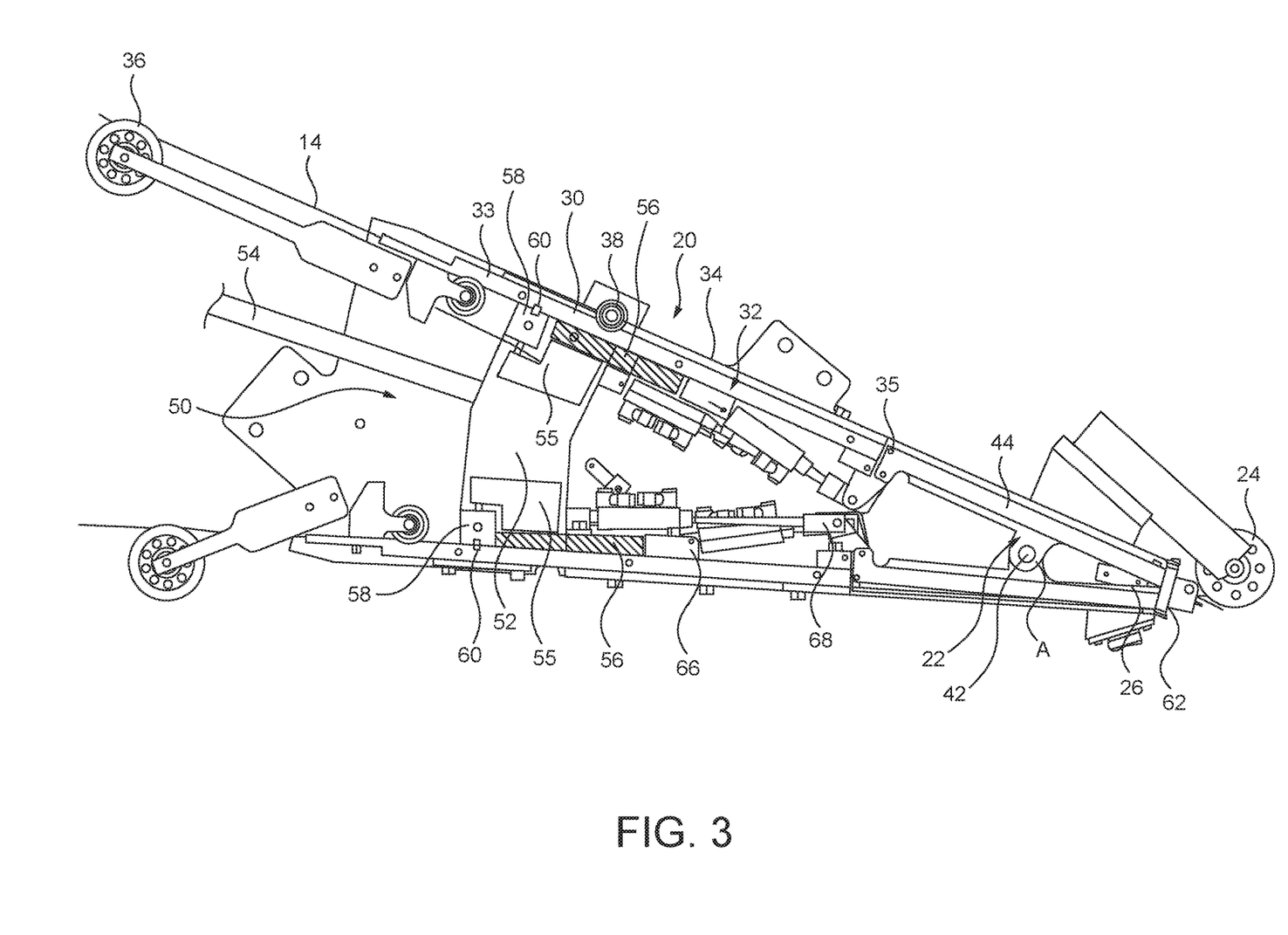
FIG. 3 shows the composite material lay-up equipment of FIG. 1 in cutaway view.

As shown in FIG. 3, a pneumatic apparatus is provided within the support head 20, comprising a vortex chiller 52 supplied with compressed air from a supply line 54. The vortex chiller is configured to produce a flow of cool gas and a flow of hot gas. In this embodiment, the flow of hot gas is vented to the environment, whereas the flow of cool gas is directed to a cooling chamber or plenum 55. Gas within the cooling chamber or plenum is used to cool upper and lower heat sink plates 56 coupled to the feed plates 30, and to provide a flow of cooled compressed air to the channels 32, as described in detail below.

The upper and lower heat sink plates 56 are coupled to the inner side (i.e. the sides within the support head 20) of the upper and lower feed plates 30, and are thermally coupled to the cooling chamber 55 of the vortex chiller 52. Accordingly, in use the upper and lower heat sink plates 56 tend to cool the feed plates 30 (in other words, heat is transferred from the feed plates 30 to the cooling chamber of the vortex chiller via the upper and lower heat sink plates). Further, cool gas is diverted from the cooling chamber 55 of the vortex chiller to the channels 32 via upper and lower manifolds 58.

Each manifold 58 distributes the cool gas between nozzles 60 extending into each of the respective channels 32 formed between the feed plate 30 and cover plate 34. Each nozzle 60 is provided with a control valve to control the flow rate of the cool gas into the respective channel. In this particular embodiment, the control valves are configured so that the flow rate of cool gas into each channel is between a minimum of 0.25 m$^3$/hour and a maximum of 2.5 m$^3$/hour.

In this embodiment, each nozzle 60 is arranged to introduce the cool gas flow to the channel along a direction parallel with the longitudinal extent of the tow 14 within the channel (i.e. the longitudinal extent of the channel 32) and extending towards the outlet 35 of each channel. In other embodiments, the nozzle 60 may be arranged to introduce the cool gas flow to the channel 32 along other directions, such as a direction perpendicular to, or having a component which is perpendicular to, the longitudinal extent of the tow 14. For example, the nozzle 60 may be arranged to introduce the cool gas flow to the channel along a direction inclined with respect to the tow direction by approximately 45°.

In this embodiment, there is a single manifold 58 associated with each feed plate 30, and a single nozzle 60 per channel. However, in other embodiments, there may be a plurality of manifolds 58 serving a plurality of nozzles 60 per channel. In particular, the pneumatic apparatus may comprise a plurality of manifolds 58 spaced along the channels on one or both sides of the channels. For example, there may be three manifolds 58 spaced apart on the inner side of each feed plate 30, and a further three manifolds 58 spaced apart on the outer side of each feed plate 30 (i.e. coupled to the cover plate 34), with corresponding nozzles 60 extending into the channels.

Further, in other embodiments, at least one manifold may be coupled to the flow of hot gas from the vortex chiller so that hot gas is introduced into channels 32 via corresponding nozzles 60 extending into the channels. For example, it may be desirable to provide cool gas via a first manifold 58 over a first portion of each channel 32 so as to cool the tow 14 received therein over the first portion of the channel, and to provide hot gas via a second manifold (not shown) over a second portion of each channel 32, so as to heat the tow 14 again prior to application on the tool. Accordingly, the tow 14 may be heated or re-heated to become tacky prior to application on the tool.

As shown in FIGS. 2 and 3, the cutting mechanism 22 is disposed adjacent to the distal ends of the two feed plates 30 and between the two tip regions of the triangular side plates 28. The cutting mechanism comprises a pivot axle 42 extending between the two side plates 28 and a plurality of elongate arms 44 mounted on the pivot axle 42 for pivoting movement about a pivot axis A extending transverse to the application direction. The pivot axle 42 slots into corresponding holes provided within the tip regions of the triangular side plates 28.

Each elongate arm 44 comprises a channel 52 which is arranged to receive a tow 14 from a tow outlet of a corresponding channel 32 of the feed plate. At the distal end of each elongate arm there is a cutting element arranged to move with the elongate arm. A cassette 62 of counteracting elements is removably attached to the support head 20 adjacent the distal end of the cutting mechanism 22 so that a plurality of counteracting elements coupled to the cassette 62 align with corresponding cutting elements mounted to the elongate arms 44 to define a nip between them.

The elongate arms 44 are coupled to linear actuators 66 via a linkage 68 so that the elongate arms 44 can be actuated to pivot about the pivot axis. Pivoting an elongate arm 44 to close the nip between the cutting element and the counteracting element causes a tow 14 extending therebetween to be severed.

The applicator roller 24 is mounted to the support head 20 at the distal end of the cutting mechanism 22 and is arranged to receive the tows 14 from the cutting mechanism 22 and apply the tows to the tool.

In use, the manipulation device 18 moves the support head 20 relative to the tool 12 so that tows 14 fed through the support head 20 and cutting mechanism 22 to the applicator roller 24 are applied to the surface of the tool 12 as part of an automatically controlled lay-up procedure. In this embodiment, the manipulation device 18 is capable of moving the support head 20 forward and back, and up and down, and the tool 12 can be moved side-to-side, and rotate about three mutually perpendicular axes. This provides six degrees of freedom.

As the tows 14 are fed through the support head 20, the vortex chiller 52 operates to generate a flow of cold gas and a flow of hot gas. In this example embodiment, the cold gas flow is distributed by the manifold 58 and nozzles 60 extending into the channels 32 carried on the support head 20, thereby inhibiting contact between the channels 32 and the tows 14 received within the channels 32, and simultaneously cooling the tows 14 so they become less tacky and less likely to adhere to the channels 32 if contact were to be made. The flow of hot gas is exhausted to the ambient environment.

As each tow 14 is fed continuously through the cutting mechanism 22, the respective elongate arm 44 is held in an open position in which the tow 14 is able to pass from the elongate arm through the cassette 62 without being cut by the cutting element or the counteracting element. At appropriate stages of the lay-up procedure, the machine 10 will determine that a fibre composite tow 14 is to be cut. The machine then activates a respective actuator for an elongate arm 44 which conveys the tow 14 to a respective nip so that the elongate arm 44 pivots and causes the nip to close, thereby severing the tow 14.

Following the cutting stroke, continued motion of the support head 20 over the tool 12 causes the applicator roller 24 to roll over the surface of the tool 12 and thereby draw the cut portion of the tow 14 away from the nip.

In this example embodiment, the tool 12 is provided with an internal heater arranged to heat the surfaces of the tool, for example, by conduction from an internal heating element. In other embodiments, a nozzle, which may be separate from a channel (i.e. not directing a jet into a channel), may direct a hot gas flow from the vortex chiller or other source onto the tool. Accordingly, the tows 14, which are cooled as they are conveyed through the support head 20, are heated by the tool 12 as they are applied to the tool 12. As the tows 14 are heated, they become tacky and therefore tend to stick to the tool 12.

Figure 4:
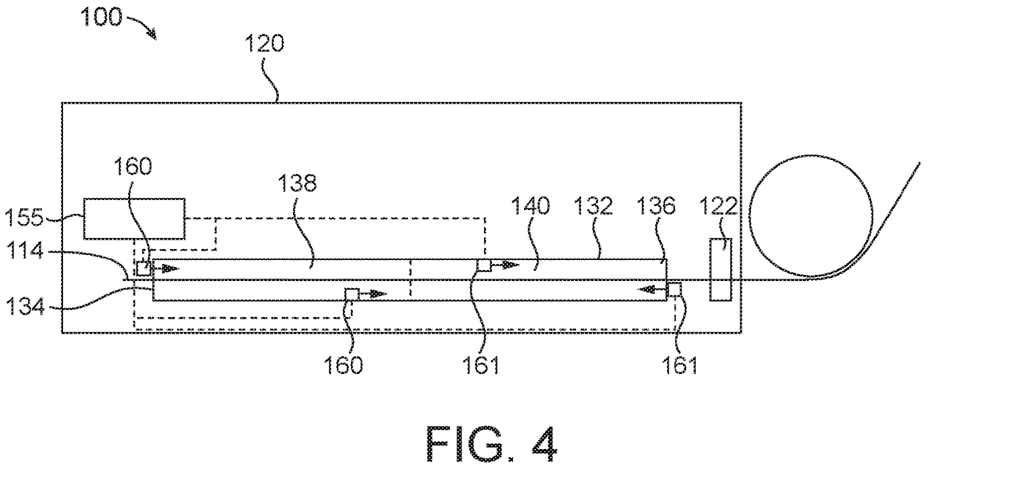
FIGS. 4-6 show further examples of composite material lay-up equipment.

FIG. 4 schematically shows example composite material lay-up equipment 100 including a composite material lay-up head 120 comprising an elongate tow guide channel 132 for guiding fibre reinforcement material 114 from a tow inlet 134 to a tow outlet 136. A cutting mechanism 122 is provided at the distal end of the head 120 adjacent the tow outlet 134. An applicator roller 124 is mounted to the support head 120 at the distal end of the cutting mechanism 122, and is arranged to receive the tows 114 from the cutting mechanism 122 and apply the tows to a tool.

The channel 132 is provided with a plurality of nozzles 160, 161. In this example, there is a nozzle 160 adjacent the tow inlet 134 and configured to deliver a jet of gas into the tow inlet (i.e. along a direction corresponding to a direction of feeding fibre reinforcement material 114 through the channel). In this example, there is also a nozzle 161 adjacent the tow outlet 136 configured to deliver a jet of gas into the tow outlet (i.e. along a direction opposing a direction of feeding fibre reinforcement material 114 through the channel). The lay-up head 120 may comprise a plurality of such channels.

In the example lay-up head 120 of FIG. 4, two opposing sides of the channel 132 are each provided with at least one nozzle to inhibit contact between the respective fibre reinforcement material and the respective opposing walls of the channel.

In the example lay-up head 120 of FIG. 4, the or each nozzle 160 is arranged to deliver a jet of gas into the respective channel along a direction substantially parallel to the elongate extent of the channel.

The channel 132 comprises a first portion 138 adjacent to the tow inlet 134 which is provided with first nozzles 160 arranged to deliver a jet of gas into the first portion 138 of the channel. In this example the first nozzles 160 are a first nozzle adjacent the tow inlet 134 towards an upper side of the channel 132, and a first nozzle within the first portion 138 towards the lower side of the channel 132.

The channel 132 further comprises a second portion 140 adjacent to the tow outlet which is provided with second nozzles 161 arranged to deliver a jet of gas into the second portion 140 of the channel. In this example, the second nozzles 161 are a second nozzle 161 adjacent the tow outlet 136 towards a lower side of the channel 132, and a second nozzle 161 within the second portion 140 towards the upper side of the channel 132.

The equipment 100 further comprises pneumatic apparatus 155 arranged to provide cool gas to the first nozzles 160 so that in use, fibre reinforcement material 114 is cooled as it travels through the channel 132. The pneumatic apparatus 155 is further arranged to provide hot gas to the second nozzles 161 so that in use, fibre reinforcement material is heated by the jets of the gas as it travels through the channel Although the above example has been described with respect to one channel 132, it will be appreciated that a lay-up head comprising multiple channels may have corresponding arrangements for each channel.

Figure 5:
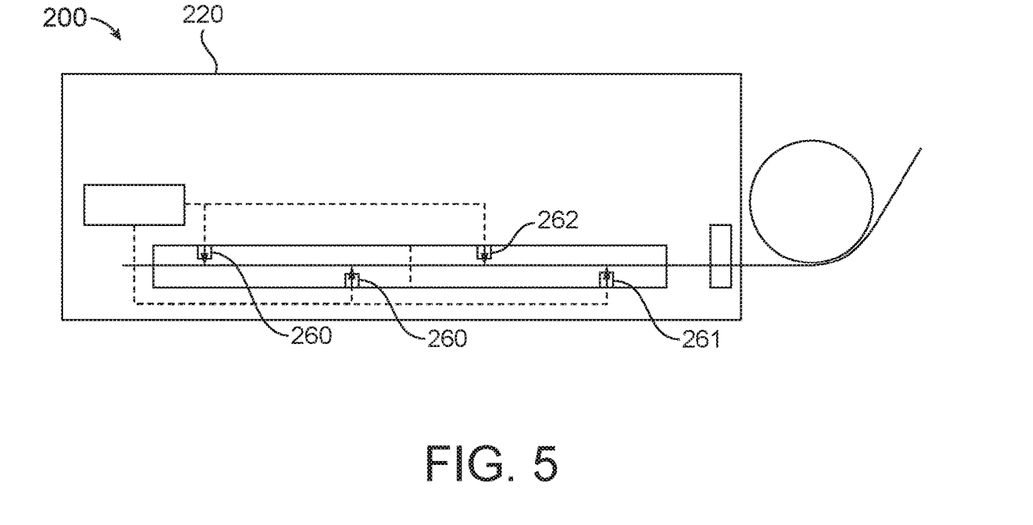

FIG. 5 schematically shows example composite material lay-up equipment 200 including a composite material lay-up head 220 similar to that described with respect to FIG. 4, but differing in that in this example the or each nozzle 260, 261 is arranged to deliver a jet of gas into the respective channel along a direction substantially perpendicular to the elongate extent of the channel.

Figure 6:
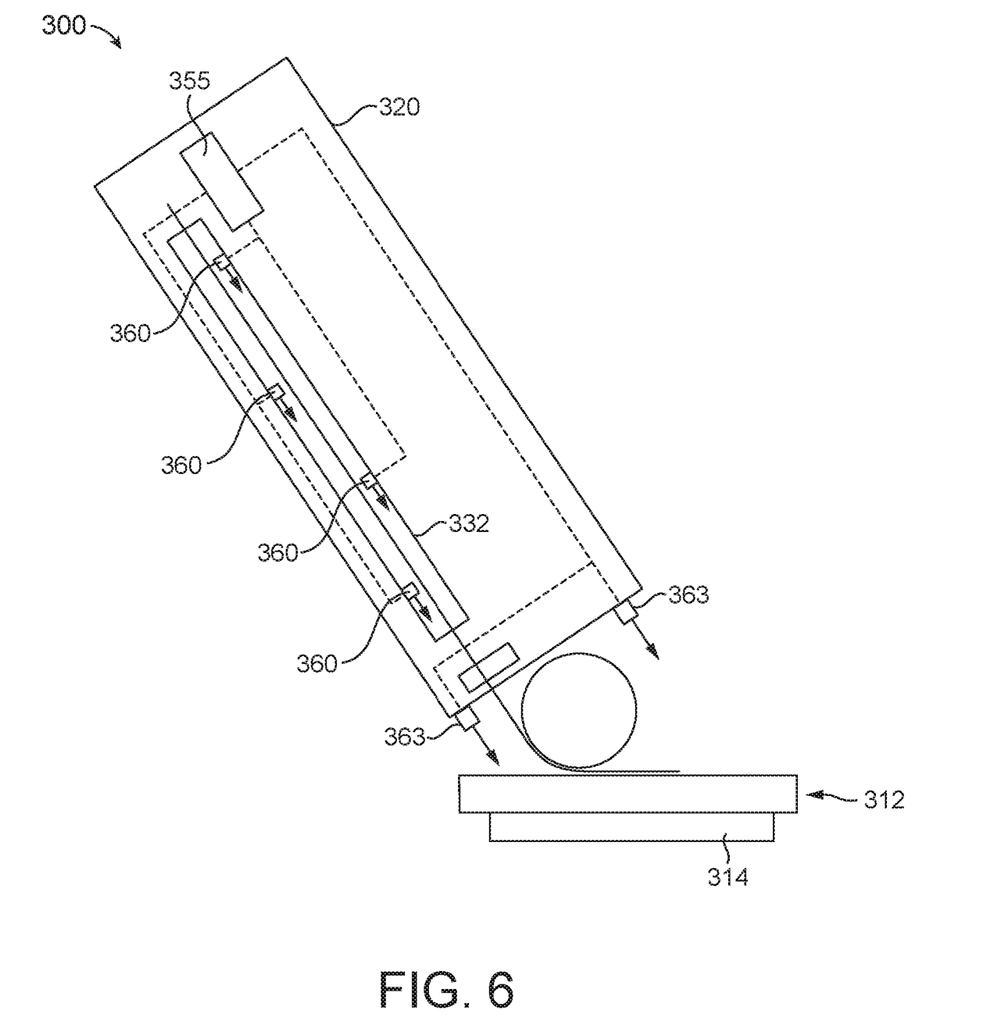

FIG. 6 schematically shows example composite material lay-up equipment 300 including a composite material lay-up head 320 similar to that described with respect to FIG. 4 but differing in aspects relating to the nozzles and gas supply, together with a tool 312. In this example, the channel 332 is provided with a plurality of nozzles 360, and there is a pneumatic apparatus 355 arranged to provide a cool gas to each nozzle, so that in use fibre reinforcement material is cooled as it travels through the channel 332.

The composite material lay-up head 320 further comprises second nozzles 363 arranged to direct a jet of gas onto the tool 312. In this example each nozzle 363 is arranged to direct a jet of gas directly onto the tool from the nozzle so that the jet does not pass through a channel for fibre reinforcement material. Accordingly, fibre reinforcement material passing through the channel is initially cooled and then heated before application to the tool. In this example, the hot gas may heat the tool so that the fibre reinforcement material is heated as it is applied to the tool. In other examples, second nozzles to deliver a hot gas may additionally or alternatively be provided to deliver a jet of hot gas into a second portion of the channel adjacent the tow outlet.

In this example, the tool is provided with a heater arranged to heat the surface of the tool, for example, by conduction from a heating element 314.

Although the invention has been described in the context of an Automatic Fibre Placement (AFP) process, it will be appreciated that the invention is equally applicable to other composite lay-up processes including Automatic Tape Laying (ATL) and automatic fibre winding.

The invention claimed is:

1. Composite material lay-up equipment for applying elongate fibre reinforcement material to a tool comprising:
a composite material lay-up head comprising:
at least one elongate tow guide channel for guiding fibre reinforcement material from a tow inlet to a tow outlet of the channel; and
feed apparatus for feeding fibre reinforcement material through the at least one channel;
wherein the or each channel comprises a first portion adjacent to the tow inlet and provided with at least one first nozzle arranged to deliver a jet of gas into the first portion of the channel, and a second portion adjacent to the tow outlet and provided with at least one second nozzle arranged to deliver a jet of gas into the second portion of the channel, so as to inhibit contact between fibre reinforcement material in the channel and the channel;
a pneumatic apparatus arranged to provide a cool gas to the or each first nozzle, so that in use, fibre reinforcement material is cooled as it travels through the or each channel;
wherein the pneumatic apparatus is arranged to provide hot gas to the or each second nozzle so that in use, fibre reinforcement material is heated prior to application on the tool.

2. Composite material lay-up equipment according to claim 1, wherein each nozzle is arranged to deliver a jet of gas into the respective channel underneath the fibre reinforcement material.

3. Composite material lay-up equipment according to claim 1, wherein each channel is provided with at least one further nozzle between the first nozzle and the second nozzle arranged to deliver a jet of gas into the respective channel.

4. Composite material lay-up equipment according to claim 3, wherein two opposing sides of each channel are each provided with at least one nozzle to inhibit contact between the respective fibre reinforcement material and the respective opposing walls of the channel.

5. Composite material lay-up equipment according to claim 1, wherein the or each nozzle is arranged to deliver a jet of gas into the respective channel along a direction substantially perpendicular to the elongate extent of the channel.

6. Composite material lay-up equipment according to claim 1, wherein the or each nozzle is arranged to deliver a jet of gas into the respective channel along a direction substantially parallel to the elongate extent of the channel.

7. Composite material lay-up equipment according to claim 1, wherein the or each nozzle is provided with a nozzle guard arranged to inhibit fibre reinforcement material from closing the nozzle by contact with the nozzle.

8. Composite material lay-up equipment according to claim 1, wherein each first nozzle is adjacent to the tow inlet and each second nozzle is adjacent to the tow outlet.

9. Composite material lay-up equipment according to claim 1, further comprising at least one nozzle arranged to direct a jet of gas onto the tool.

10. Composite material lay-up equipment according to claim 1, wherein the pneumatic apparatus comprises a vortex chiller.

11. Composite material lay-up equipment according to claim 1, wherein the pneumatic apparatus is arranged to cool at least part of the composite-material lay-up head so that the walls of the channels are cooled at least partly by conduction.

12. Composite material lay-up equipment according to claim 1, wherein the pneumatic apparatus is mounted to the composite material lay-up head.

13. A method of applying composite material to a tool using a composite material lay-up equipment comprising:
a composite material lay-up head comprising:
at least one elongate tow guide channel for guiding fibre reinforcement material from a tow inlet to a tow outlet of the channel; and
feed apparatus for feeding fibre reinforcement material through the at least one channel;
wherein the or each channel comprises a first portion adjacent to the tow inlet and provided with at least one first nozzle arranged to deliver a jet of gas into the first portion of the channel, and a second portion adjacent to the tow outlet and provided with at least one second nozzle arranged to deliver a jet of gas into the second portion of the channel, so as to inhibit contact between fibre reinforcement material in the channel and the channel; and
a pneumatic apparatus arranged to provide a cool gas to the or each first nozzle, so that in use, fibre reinforcement material is cooled as it travels through the or each channel;
the method comprising:
guiding elongate fibre reinforcement material through the or each channel;
delivering a jet of gas into the or each channel through the or each nozzle so that the jet of gas inhibits contact between the fibre reinforcement material and the channel, including:
delivering a jet of cool gas into the first portion of the or each channel so that the fibre reinforcement material is cooled as it travels through the or each channel; and
delivering a jet of hot gas into the second portion of the or each channel so that the fibre reinforcement material is heated prior to application on the tool; and
applying the lengths of elongate fibre reinforcement material to the tool.

14. A method according to claim 13, further comprising heating the tool so that the fibre reinforcement material is heated as it is applied to the tool.

\* \* \* \* \*

UNITED STATES PATENT AND TRADEMARK OFFICE
CERTIFICATE OF CORRECTION

| | | Page 1 of 1 |
|---|---|---|
| PATENT NO. | : 11,117,333 B2 | |
| APPLICATION NO. | : 16/348491 | |
| DATED | : September 14, 2021 | |
| INVENTOR(S) | : James Tingle | |

It is certified that error appears in the above-identified patent and that said Letters Patent is hereby corrected as shown below:

In the Claims

In Column 9, Line 67, in Claim 5, after "wherein", delete "the or"

In Column 10, Line 5, in Claim 6, after "wherein", delete "the or"

In Column 10, Line 9, in Claim 7, after "wherein", delete "the or"

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*